US012079087B2

United States Patent
Bohra et al.

(10) Patent No.: US 12,079,087 B2
(45) Date of Patent: Sep. 3, 2024

(54) SYSTEMS AND METHODS FOR FAILURE RECOVERY IN AT-MOST-ONCE AND EXACTLY-ONCE STREAMING DATA PROCESSING

(71) Applicant: Akamai Technologies, Inc., Cambridge, MA (US)

(72) Inventors: Aniruddha Bohra, Philadelphia, PA (US); Florin Sultan, Medford, MA (US); Umberto Boscolo Bragadin, Belmont, MA (US); James Lee, Weston, MA (US); Solomon Lifshits, Watertown, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 227 days.

(21) Appl. No.: 17/383,187

(22) Filed: Jul. 22, 2021

(65) Prior Publication Data
US 2023/0025059 A1    Jan. 26, 2023

(51) Int. Cl.
*G06F 11/14*    (2006.01)
*G06F 11/07*    (2006.01)
(Continued)

(52) U.S. Cl.
CPC ...... *G06F 11/1435* (2013.01); *G06F 11/0772* (2013.01); *G06F 11/1464* (2013.01);
(Continued)

(58) Field of Classification Search
CPC . H04L 1/18; H04L 1/189; H04L 69/10; H04L 41/0654; H04L 1/1835;
(Continued)

(56) References Cited

U.S. PATENT DOCUMENTS

| 10,798,006 B2 | 10/2020 | Bohra et al. |
| 2011/0145763 A1* | 6/2011 | Dong ............... H04L 43/045 715/823 |

(Continued)

OTHER PUBLICATIONS

R. Barga, D. Lomet and G. Weikum, "Recovery guarantees for general multi-tier applications," Proceedings 18th International Conference on Data Engineering, San Jose, CA, USA, 2002, pp. 543-554, doi: 10.1109/ICDE.2002.994773. (Year: 2002).*

(Continued)

*Primary Examiner* — Patrice L Winder

(57) ABSTRACT

This patent document describes failure recovery technologies for the processing of streaming data, also referred to as pipelined data. The technologies described herein have particular applicability in distributed computing systems that are required to process streams of data and provide at-most-once and/or exactly-once service levels. In a preferred embodiment, a system comprises many nodes configured in a network topology, such as a hierarchical tree structure. Data is generated at leaf nodes. Intermediate nodes process the streaming data in a pipelined fashion, sending towards the root aggregated or otherwise combined data from the source data streams towards. To reduce overhead and provide locally handled failure recovery, system nodes transfer data using a protocol that controls which node owns the data for purposes of failure recovery as it moves through the network.

11 Claims, 12 Drawing Sheets

(51) Int. Cl.
*H04L 1/18* (2023.01)
*H04L 1/1867* (2023.01)
*H04L 69/10* (2022.01)
*H04L 41/0654* (2022.01)

(52) U.S. Cl.
CPC ............ *G06F 11/1469* (2013.01); *H04L 1/18* (2013.01); *H04L 1/189* (2013.01); *H04L 69/10* (2013.01); *H04L 41/0654* (2013.01)

(58) Field of Classification Search
CPC ......... H04L 2001/0097; G06F 11/1435; G06F 11/0772; G06F 11/1464; G06F 11/1469; G06F 11/1443
See application file for complete search history.

(56) References Cited

U.S. PATENT DOCUMENTS

| | | | | |
|---|---|---|---|---|
| 2012/0137018 | A1* | 5/2012 | Uhlig ...................... | G06F 11/00 709/231 |
| 2012/0137164 | A1* | 5/2012 | Uhlig ...................... | G06F 11/00 714/4.11 |
| 2017/0083396 | A1* | 3/2017 | Bishop ................. | G06F 11/1438 |
| 2018/0139118 | A1* | 5/2018 | Johnson .............. | H04L 41/0663 |
| 2019/0130004 | A1* | 5/2019 | Singh ................ | G06F 16/24568 |
| 2019/0278860 | A1* | 9/2019 | Modai ............... | G06F 16/24568 |
| 2021/0365456 | A1* | 11/2021 | Kondiles ............... | G06F 16/248 |

OTHER PUBLICATIONS

E. G. Renart, J. Diaz-Montes and M. Parashar, "Data-Driven Stream Processing at the Edge," 2017 IEEE 1st International Conference on Fog and Edge Computing (ICFEC), Madrid, Spain, 2017, pp. 31-40, doi: 10.1109/ICFEC.2017.18. (Year: 2017).*
Apache Storm, Version: 2.2.0, Trident Tutorial, Downloaded on Jul. 6, 2021, 8 pages. available at https://storm.apache.org/releases/2.2.0/Trident-tutorial.html.
MicrosoftResearch/Naiad: The Naiad system provides fast incremental and iterative computation for data-parallel workloads, Downloaded on Jul. 6, 2021, https://github.com/MicrosoftResearch/Naiad, 4 pages.
Alvisi, L. et al., "Message Logging: Pessimistic, Optimistic, Causal, and Optimal", IEEE Transactions on Software Engineering, vol. 24, No. 2, Feb. 1998, 11 pages.
Apache Flink, , "What is Apache Flink?—Architecture", Downloaded on Jun. 17, 2021. https://flink.apache.org/flink-architecture.html, 2 pages.
Apache Flink 1.4, , "(//ci.apache.org/projects/flink/flink-docs-release-1.4) v1.4", Downloaded on Jun. 2, 2021. https://ci.apache.org/projects/flink/flink-docs-release-1.4/ops/state/checkpoints.html, 4 pages.
Apache Storm, , "(/index.html)", Downloaded on Jun. 17, 2021. https://storm.apache.org/index.html, 3 pages.
Apache Storm, , "Version: 2.2.0, Tutorial.", Downloaded on Jun. 17, 2021. https://storm.apache.org/releases/2.2.0/Tutorial.html, 9 pages.
Carbone, P. et al., "Lightweight Asynchronous Snapshots for Distributed Dataflows, Jun. 29, 2015, 8 pages.", arXiv:1506.08603v1, Jun. 29, 2015.
Chandy, K. et al., "Distributed Snapshots: Determining Global States of Distributed Systems, University of Texas at Austin", ACM Transactions on Computer Sys., vol. 3, No. 1, Feb. 1985, pp. 63-75, Downloaded Jul. 6, 2021 from https://courses.cs.washington.edu/courses/csep552/16wi/papers/chandy-snapshots.pdf, 13 pages.
Cohen, et al., ""Keeping Track of 70,000+ Servers: The Akamai Query System,"", Proceedings of the 24th USENIX Large Installation System Administration Conference (LISA), Nov. 2010, 15 pages.
Lin, W. et al., "StreamScope: Continuous Reliable Distributed Processing of Big Data Streams", Proceedings of the 13th USENIX Symposium on Networked Systems Design and Implementation (NSDI '16). Mar. 16-18, 2016. https://www.usenix.org/conference/nsdi16/technical-sessions/presentation/lin, 16 pages.
Murray, D. et al., "Naiad: a Timely Dataflow System.", Downloaded on Jul. 7, 2021, 17 pages, , published SOSP '13, Nov. 3-6, 2013, Pennsylvania, USA, pp. 439-455. https://www.sigops.org/s/conferences/sosp/2013/papers/p439-murray.pdf.
Nowojski, Piotr , "An Overview of End-to-End Exactly-Once Processing in Apache Flink (with Apache Kafka, too!)", Downloaded on Jun. 2, 2021, 8 pages. https://flink.apache.org/features/2018/03/01/end-to-end-exactly-once-apache-flink.html, Mar. 1, 2018.
Nygren, , "The Akamai Network: a Platform for High-Performance Internet Applications, 18 pages,", ACM SIGOPS Operating Systems Review archive, vol. 44 Issue 3, Jul. 2010 pp. 2-19.
Repantis, Thomas et al., "Scaling a Monitoring Infrastructure for the Akamai Network", ACM SIGOPS Operating Systems Review, vol. 44, No. 3, Jul. 2010., 7 pages.
Silvestre, P. et al., "Clonos: Consistent Causal Recovery for Highly-Available Streaming Dataflows, 13 pages.", SIGMOD '21, Jun. 20-25, 2021, Virtual Event, China, Delft University of Technology.
Tzoumas, K. , "High-throughput, low-latency, and exactly-once stream processing with Apache Flink™", Downloaded on Jun. 2, 2021, 18 pages. https://www.ververica.com/blog/high-throughput-low-latency-and-exactly-once-stream-processing-with-apache-flink.
Wang, S. et al., "Lineage Stash: Fault Tolerance Off the Critical Path", SOSP '19, Oct. 27-30, 2019, Huntsville, ON, Canada, 15 pages.

* cited by examiner

SYSTEMS AND METHODS FOR FAILURE RECOVERY IN AT-MOST-ONCE AND EXACTLY-ONCE STREAMING DATA PROCESSING

BACKGROUND

Technical Field

This application generally relates to the processing of streaming data, including in particular the aggregation and summarization of large sets of source data (such as web logs or distributed system events), and also to failure recovery in such contexts.

Brief Description of the Related Art

Fault tolerant message processing systems are known in the art. Common techniques for recovery are logging and checkpoint based recovery [Alvisi98]. During normal operation, individual nodes log all sources of non-determinism—such as inputs, environment variables, timers, outputs, etc.—that influence recovery. For example, in a continuous query system, showing the end-user an aggregation result requires recording the aggregation event in the recovery log. To prevent the log from growing unbounded, a checkpoint is defined as a consistent point across the system where each instance can safely resume processing.

Traditionally, such checkpointing techniques were considered too expensive because all interactions must be written to stable storage—and for some failure models, to a remote node. Recent advances in streaming data processing have made log based recovery feasible. First, streaming applications are often now composed of deterministic operators that require only the inputs to be logged. Second, recently developed reliable message queueing systems (e.g., Kafka, Amazon Kinesis, etc.) and large-scale distributed storage systems (e.g., Spanner, HDFS, Ceph, etc.) have allowed distributed checkpoints with low overheads and enabled efficient data replay in a cluster.

Apache Storm implements exactly-once message processing semantics using Trident, an API implemented on top of the Spout (data source), and Bolt (operator) abstractions. Trident defines a batch of incoming data tuples and assigns it a unique identifier (transaction_id). Completed transactions are recorded in a key-value store and Trident ensures all batches must be completed in-order of their transaction identifiers. This solution is acceptable if state storage overhead is low, and executors for every batch retry until their state is committed. Unfortunately, this stops data flow and the entire topology moves at the rate of the slowest batch processor and does not handle continuous data ingestion.

Other efforts at tackling failure recovery with limited non-determinism in applications tend to fall into two categories, lineage-based and distributed-checkpoint based recovery.

In lineage-based recovery, individual tasks record their input and other dependencies, e.g., input order. The lineage is used to reschedule tasks on failure and to retrieve data from a queueing system or a centralized storage system. In general, the lineage based systems are inefficient at run time as the lineage must be recorded before a task starts. However, for recovery, the system does not need to rollback all tasks and must re-execute only those tasks required to reconstruct the failed instances. LineageStash [Wang19] makes this practical for a distributed computation platform, called Ray. Using a local in-memory store, a sharded object store, and forwarding lineage to the execution instance on scheduling, LineageStash reduces the runtime overhead while retaining the advantage of replaying only the tasks that failed.

Distributed checkpointing algorithms that are variants of the Chandy-Lamport algorithm have been implemented for stream processing systems [Flink, Naiad]. Operators maintain local state snapshots at each instance that together represent a global snapshot for recovery. In this model, asynchronous checkpoints without coordination limit the runtime overhead. However, on failure, the entire system must rollback to a common starting point and replay the entire stream causing high recovery latency.

To reduce recovery latency, Clonos builds fast recovery for Flink stream processing [Silvestre21]. The Clonos system runtime creates a primary-backup operator pair that is fed the same inputs. On operator failure, the secondary operator takes over, synchronizes the input by requesting replay from the upstream operators and its output state by discarding output buffers. This approach is similar to a process-pair execution. Clonos also maintains channel states and a log of non-deterministic events on local storage. Distributed checkpoints are used to trim these logs.

While current solutions have their own benefits, they cannot be deployed over the wide-area-network where centralized storage or a message queueing system is not readily available and/or impractical.

This patent document discloses, inter alia, methods and systems for streaming data processing that overcome prior weaknesses. In such methods and systems, scheduling can be data-driven and tasks can be defined by a set of incoming data streams. The teachings hereof are particularly useful with applications that adhere to a distributed dataflow with deterministic operators, and where the order of inputs is not important.

The teachings presented herein can be used to improve the functioning of a computer system itself, that is, by improving the efficiency, capability, and operation of streaming data systems and the algorithms running within them. Those skilled in the art will understand these and other improvements from the teachings hereof.

REFERENCES

[Alvisi98] Alvisi, Lorenzo, and Keith Marzullo. "Message logging: Pessimistic, optimistic, causal, and optimal." IEEE Transactions on Software Engineering 24.2 (1998): 149-159.

[Wang19] Wang, Stephanie, et al. "Lineage stash: fault tolerance off the critical path." Proceedings of the 27th ACM Symposium on Operating Systems Principles. 2019.

[Silvestre21] Silvestre, Pedro F., et al. "Clonos: Consistent Causal Recovery for Highly-Available Streaming Dataflows.". ACM Symposium on Management of Data (SIGMOD 2021).

[Wei16] Lin, Wei, et al. "Streamscope: continuous reliable distributed processing of big data streams." 13th USENIX Symposium on Networked Systems Design and Implementation (NSDI 16). 2016.

[Flink] Apache Flink, flink.apache.org

[Storm] Apache Storm, storm.apache.org

[Naiad] D. G. Murray, F. McSherry, R. Isaacs, M. Isard, P. Barham, and M. Abadi. Naiad: a timely dataflow system. In Proceedings of the Twenty-Fourth ACM Symposium on Operating Systems Principles, pages 439-455, ACM, 2013.

[Chandy] Chandy, K. Mani, and Leslie Lamport. "Distributed snapshots: Determining global states of distributed systems." ACM Transactions on Computer Systems (TOCS) 3.1 (1985): 63-75.

BRIEF SUMMARY

This section describes some pertinent aspects of this invention. They are illustrative, not exhaustive, and they are not a definition of the invention. The claims of any issued patent define the scope of protection.

This patent document describes, inter alia, failure recovery technologies for the processing of streaming data. The technologies described herein have particular applicability in distributed computing systems that are processing streams of data with at-most-once and/or exactly-once service levels. In a preferred embodiment, a distributed computing system comprises many nodes configured in a network topology, such as a hierarchical tree. Data is generated at leaf nodes. Intermediate nodes process the streaming data in a pipelined fashion, sending aggregated or otherwise processed data from the combined source data towards the root. To reduce and provide locally driven failure recovery, nodes transmit data from one to another using a protocol that determines which node owns the data for purposes of failure recovery as it moves through the system. Failure recovery can be performed locally and independently, without the need for a centralized checkpointing system or logging.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
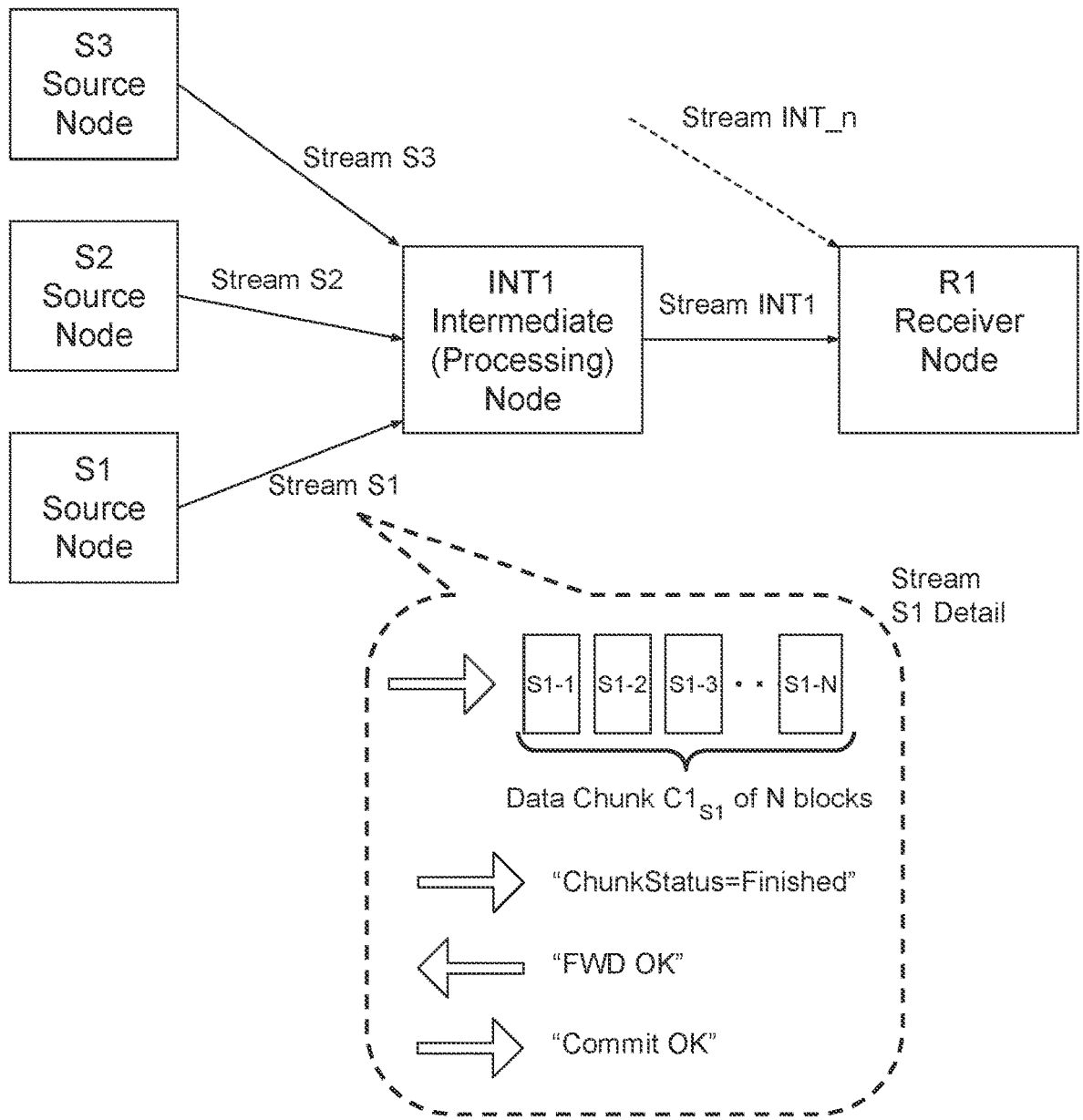
FIG. 1 is a block diagram illustrating a system for streaming data processing with several nodes, in accordance with one embodiment of the teachings hereof; and, FIG. 2 is a block diagram illustrating the operation of the system shown in FIG. 1, in the absence of failures.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. References to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Streaming data is also referred to equivalently as pipelined data in this document.

Overview

The following is an overview of certain aspects of a system that processes streams of data ingested from multiple sources. Each input stream can be considered as a finite segment of an infinitely long sequence. Incoming raw data segments, referred to as chunks, can each be assigned a unique identifier. The output of the system operators includes the set of input chunk identifiers as outgoing metadata. (This specific aspect is similar to LineageStash [Wang19], mentioned in the BACKGROUND section, with the lineage consisting of the input segment identifiers of the parent.) The union of all chunk identifiers at the receiver is the set of all chunks that contribute to the final system output sent to sinks.

Failure recovery can be handled locally, such that each node in the system makes an independent decision on which chunks to use to recover inputs to the operators and thereby produce output chunks. A special protocol at each node of the data flow graph can be used to ensure there is no duplication. In some implementations, in order to minimize disk writes, data can be buffered in memory until a failure to buffer forces writes to persistent storage. In general, the system does not require a centralized object storage to store the lineage and does not require a global checkpoint to be constructed periodically for garbage collection.

For most applications, an at-most-once guarantee with failure recovery is sufficient. However, to ensure exactly-once processing for those use cases that demand it, the system can perform reprocessing. Reprocessing is accomplished by making the input chunk identifiers available at the sink to identify missing chunks and having the (source) nodes store raw data for these chunks. When reprocessing, it is generally not possible to distinguish between long delays in any part of the system and failures. Therefore, the system can use the stored chunk identifiers to identify duplicates and discard duplicate data.

FIG. 1 illustrates an example of a basic system. Note that for simplicity in explaining system concepts and operation, it includes only a small set of nodes which would typically be a part of a larger system. In this example there are three source nodes S1, S2, S3. Each generates a stream of data, e.g., from logs of web server transactions, security alerts, or any other event. When a certain amount of data has been collected, or a certain amount of time has passed, a given source node makes a call to an assigned intermediate node. The source node can discover which intermediate node to use via a DNS lookup on a well-known hostname or in any other suitable manner.

The intermediate node is labeled as INT1 in FIG. 1. It is also referred to herein as a proxy node. The intermediate node INT1 processes the streams of data from multiple source nodes, S1, S2, S3, performing a configured operation(s) on the inputs to generate an output data stream INT1 (left to right in FIG. 1) to receiver node R1. In this way the input data streams are combined to create an output data stream. Examples of the kinds of operations include aggregation or other types of processing known in the art. In general, this kind of processing means that the input data chunks cannot be recovered from the output data stream (or perhaps can be recovered but only with great cost and/or uncertainty).

Of course, FIG. 1 is a basic diagram; in a large system, the receiver R1 may itself be an intermediate node, processing data from several other nodes and transmitting the result onwards downstream, eventually reaching a sink node. FIG. 1 illustrates this possibility with the dashed line indicating a separate intermediate node stream INT_n arriving at the receiver node R1. Receiver node R1 sends the output data stream to a data sink (which can be a separate component or in some cases R1 itself might be the sink).

Returning to system operation, assume that source node S1 makes a call to a node INT1 in order to send a chunk of data, referred to as C1_S1.

(Note that a chunk of data merely refers to a unit of data which is transferred between nodes. Nodes can use a "size or time" trigger to determine when to call the receiver and send the queued data; this means that a node transmits downstream after collecting data of a certain size or after the expiry of a certain time period, whichever comes first. The size or time thresholds provide a way to control the amount of queued data at the sender, as well as the call rate.)

The nodes S1, INT1 open a communication session and S1 sends INT1 blocks of data that make up input data chunk C1_S1, which is shown in the box labeled Stream S1 detail. After the last block is sent, S1 sends a status message such as 'ChunkStatus=Finished' to tell INT1 that S1 has sent all blocks in the data chunk C1_S1. The nodes then exchange acknowledgment messages, "FWD OK" and "Commit OK" to acknowledge the transfer.

The message exchange functions to transfer responsibility for failure recovery with respect to the handling of the data chunk C1_S1 from node S1 to node INT1. For example, if there is an error in transferring the data chunk, then this message exchange does not succeed, and responsibility to re-transmit thus remains with S1. In such a situation it is incumbent on S1 to have maintained storage of data for C1_S1 and be able to retransmit the data (e.g., pulling it from a local log or data store or otherwise). In contrast, if an error occurs after the message exchange, then S1 will not retransmit. S1 does not need to maintain a copy for retransmission, although if the system supports re-processing, it must ensure a copy is kept (locally or in a separate component) until full pipeline verification is complete. Since the message exchange completed, INT1 has the responsibility of incorporating the data chunk C1_S1 into the outgoing data stream INT1. For example, assume the error occurs in local processing at the node INT1, or in INT1 attempting to send an output data chunk based on C1_S1 to the downstream node R1. It is the responsibility of INT1 to ensure that data chunk C1_S1 is maintained locally such that it can be incorporated into an output data stream. In this way, the protocol enables each node to independently determine how to handle failure recovery and enables the node to use local data to recover from a failure.

It is important to recognize that INT1 is receiving multiple data streams from multiple source nodes contemporaneously. INT1 is processing such input data streams to produce an output data stream INT1 in a pipelined fashion. For example, INT1 is typically aggregating input data chunks as they arrive and beginning to send an output data chunk in the output stream. As mentioned above, INT1 can use a "size or time" trigger for the data queue: once a certain amount of data arrives, or a certain time period elapses (both configurable values), INT1 begins constructing the output data chunks and sending them. Therefore, if and when an error occurs in an input data chunk, failure recovery may require canceling the output stream (as it incorporates a "bad" input data chunk) and re-sending. That re-sent output data chunk may be created from the "good" input data chunks and may omit the "bad" input data chunk, because it can be incorporated into a later output data chunk (at least in some use cases).

In preferred implementations, the intermediate node INT1 maintains input data chunks in volatile memory during normal processing. Upon an error, it writes input data chunks to disk to preserve them for recovery processing.

Figure 2:
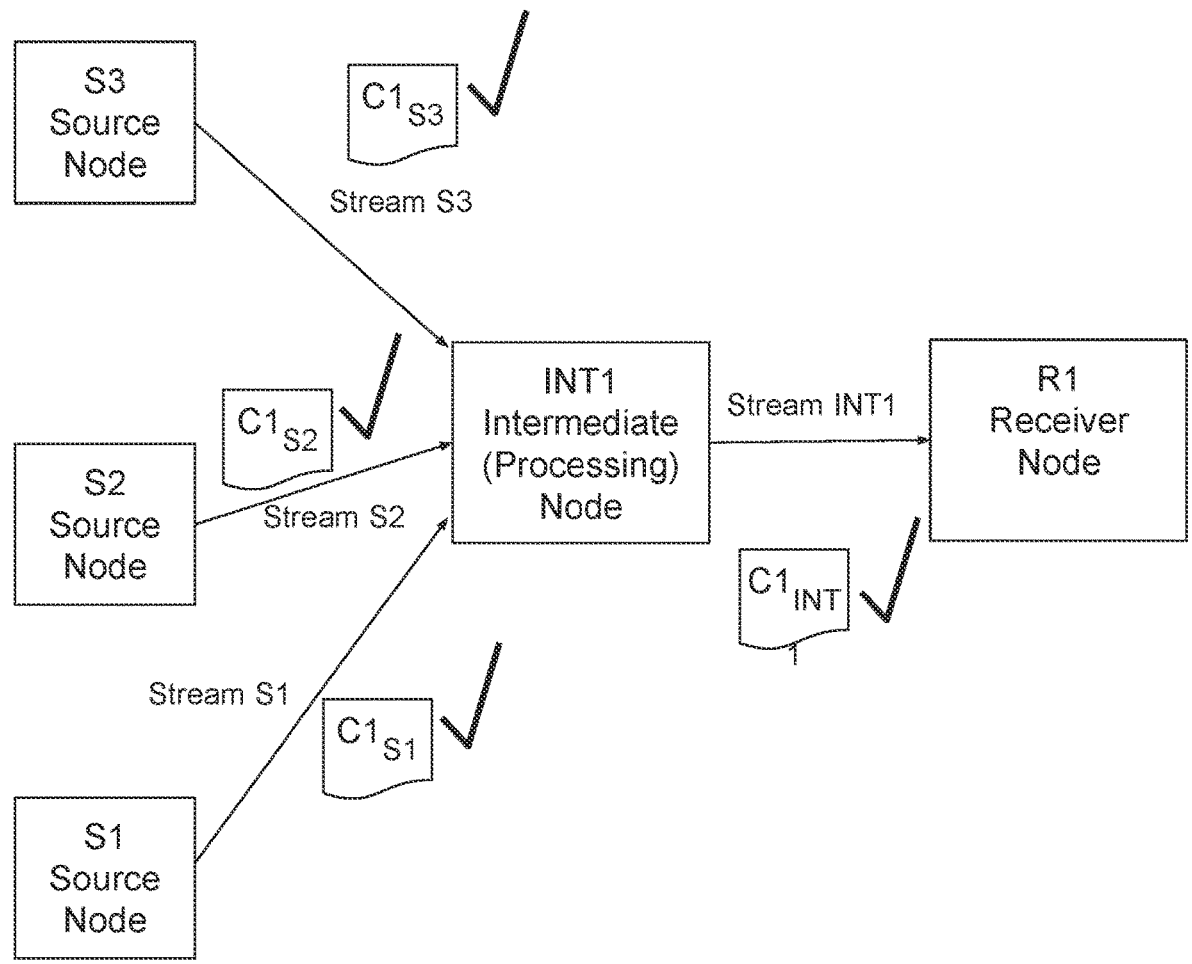

FIG. 2 illustrates the operation of FIG. 1 nodes without a failure of the kind being discussed herein. Each of the source nodes S1, S2, S3 is successfully transferring input data chunks C1_S1, C1_S2, C1_S3 (respectively). (Note that the notation of input data chunk C1 is not meant to imply that the input data chunks are the same. The numbering of data chunks is to distinguish chunks in a given stream, e.g., S1, S2, S3.) INT1 processes the input data chunks as they arrive and generates from them one or more output data chunks, C1_INT1, which it is sending to R1.

Figure 3:
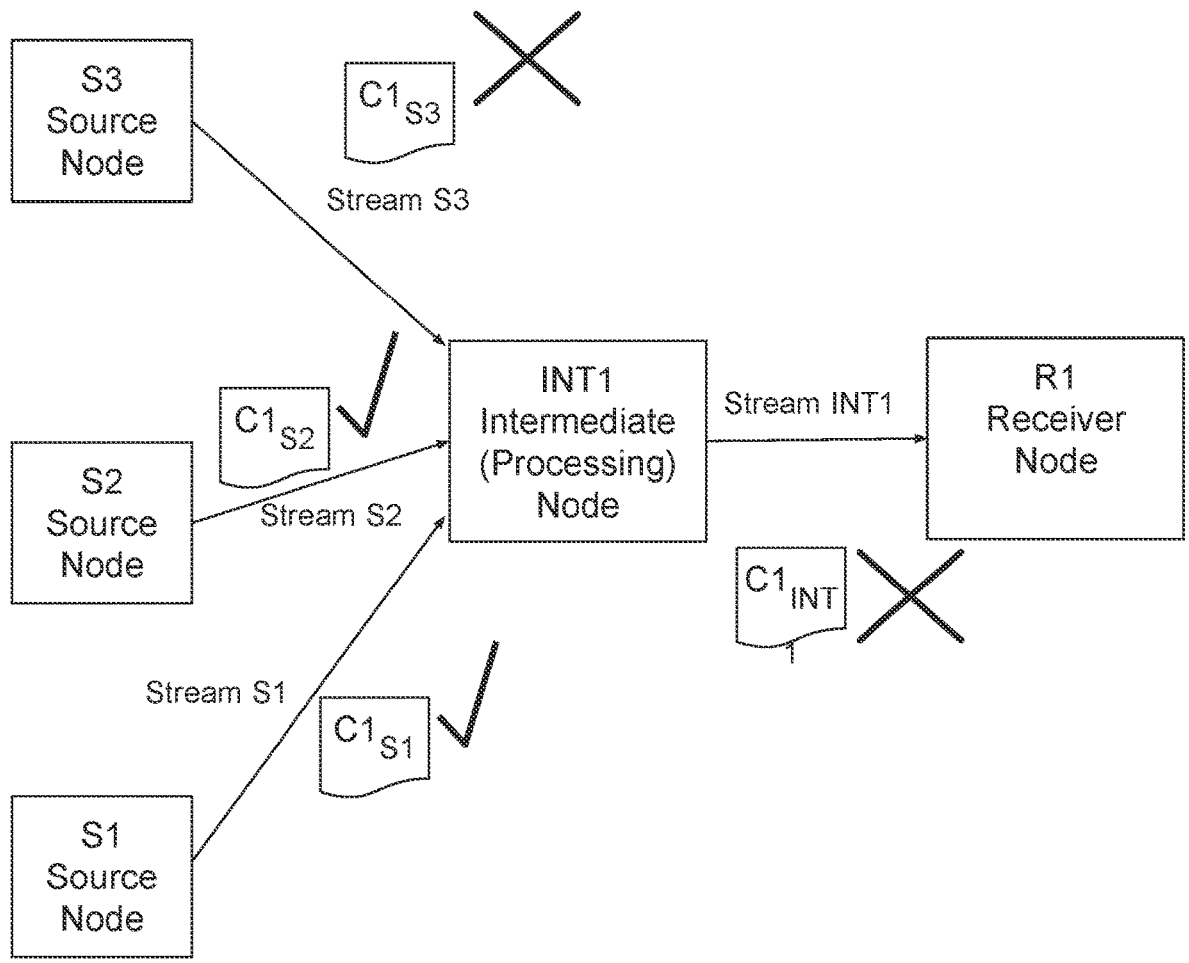
FIG. 3 is a block diagram illustrating the operation of the system shown in FIG. 1, with a failure in the transfer of a data chunk from S3.

FIG. 3 illustrates the operation of the FIG. 1 nodes when a failure occurs in transferring one of the input data chunks—in this case, in receiving C1_S3 at INT1. The failure occurs prior to the message exchange that would otherwise handoff the input data chunk to INT1. Therefore, INT1 sends an error message on stream INT1, alerting R1 to delete any partial data already sent on stream INT1 (e.g., any partial data chunk of C1_INT1). INT1 then stores the successful input data chunks C1_S1, C1_S2 (e.g. moving from volatile to non-volatile storage) and, in a failure recovery job, regenerates the output data chunk C1_INT1 from the two successful input data chunks and/or others that might arrive in time.

Figure 4:
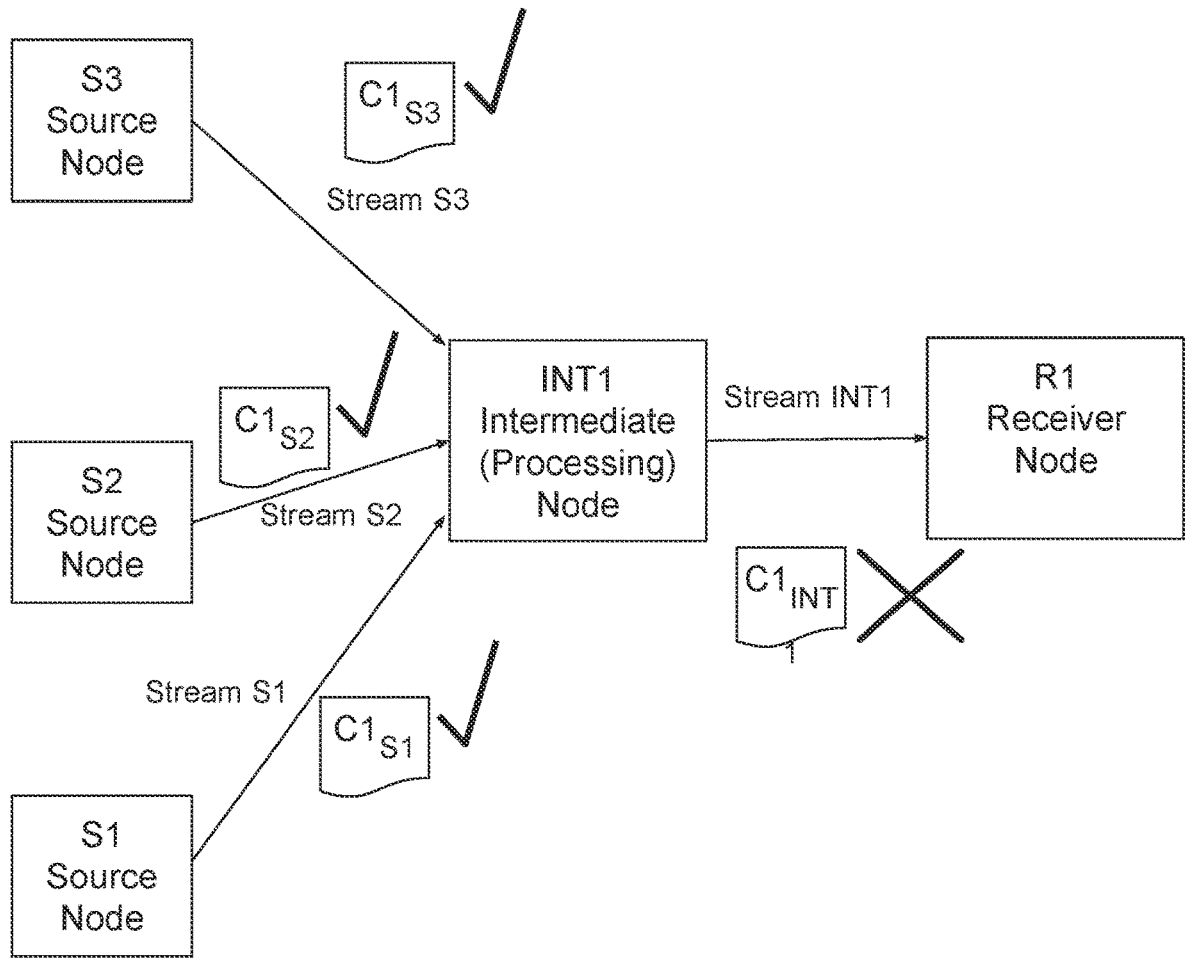
FIG. 4 is a block diagram illustrating the operation of the system shown in FIG. 1, with a failure in the transfer of a data chunk from INT1 to R1.

FIG. 4 illustrates the operation of the FIG. 1 nodes when all of the input data chunks are successfully received and the handoff message exchanges completed, but an error occurs afterwards (e.g. in INT1's internal processing or in sending the output data chunk C1_INT1 to the receiver node R1). In this case, INT1 sends an error message on stream INT1, alerting R1 to delete any partial data already sent on stream INT1 (i.e., any partial data chunk of C1_INT1). INT1 then stores all of the successful input data chunks C1_S1, C1_S2 and regenerates an output data chunk for subsequent re-transmission to R1.

This provides an "at-most-once" service level. As noted, the above-described system can be enhanced with an "exactly-once" service feature. This means that the system has a way to audit whether each input data chunk has been received at the sink node, possibly after having been processed at intermediate nodes. Each chunk is tagged with metadata identifying the input data chunk which it contains or the input chunks from which it was created. For example, output data chunk C1_INT1 would be tagged as C1_INT1: C1_S1, C1_S2, and C1_S3. A system tracking component at the output to the sink will receive such metadata with chunk identifiers for all input data chunks from all source nodes. The source nodes also send the chunk identifiers directly to a tracking component in the system that is at the end of the pipeline. As a result, this tracking component can compare the two sets of chunk identifiers. Missing chunks can be requested directly from the source node or from an archival component associated with the source node. This audit process preferably occurs asynchronously to the stream data processing. In some embodiments, the sink itself could perform these operations of the tracking component.

With the above description of system principles and concepts, additional details are now provided.

System Model

Figure 5:
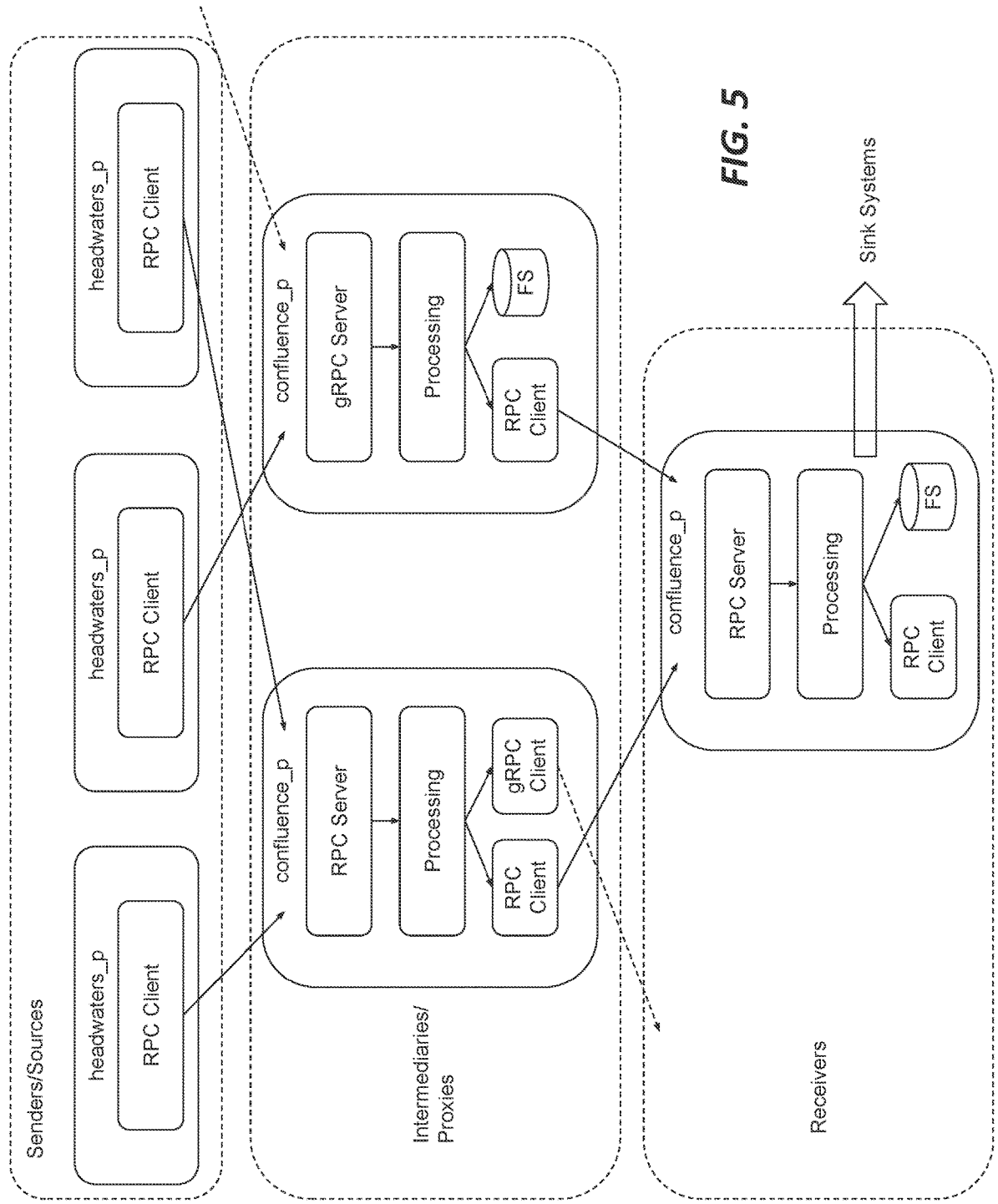
FIG. 5 is a block diagram illustrating the details of one implementation of a system in accord with the teachings hereof.

The system processes incoming streaming data in a pipe-lined fashion, as shown in FIG. 5. Long running services, called 'headwaters_p', run on source nodes (SOURCE) and generate data from raw logs. In this implementation, the data is in the protobuf format and is organized as records. Note that many other data formats may be used; the protobuf format is provided just as an example. This implementation assumes that all processing is Associative, Commutative, and Idempotent. Therefore, processing the same set of inputs generates identical results without any other side effects. The order of processing subsets does not affect the final results.

With reference to FIG. 5, the processes 'headwaters_p' accumulate records into messages and send them downstream using a streaming RPC call (remote procedure call, implemented e.g., using gRPC). The process shown as 'confluence_p' is a long running service that implements the RPC endpoint that receives record data from the source nodes and performs processing on it. The services can be organized as an inverted funnel or aggregation tree. Therefore confluence_p also acts as a client to other nodes running confluence_p that are downstream. The multi-layer topology is terminated when the data is written for consumption by a sink, e.g., services external to the system or part of the receiver node (but not illustrated in FIG. 5). Note that the dotted line arrows in FIG. 5 represent the possibility that other nodes (sources, intermediaries) may be interconnected into this topology in an actual running system.

Based on its position in the topology, a node can be classified as (1) sender or source, (2) intermediate node or proxy, (3) receiver node.

Exactly-once processing requires the system to reprocess data on failure and ensure that such reprocessing does not generate duplicates. As a basic building block, the RPC protocol between any two nodes must be defined to ensure no duplication and all-or-nothing transfer. Once the protocol is in place, we must create the mechanism to ensure reprocessing on failures that affect any node in the topology.

Internode Protocol Supporting Failure Recovery

The RPC clients and RPC servers use a special internode protocol when communicating between any two nodes in the graph shown in FIG. 5. The client in the protocol initiates a streaming RPC call, where multiple messages are sent over the same RPC session. The message contains an opcode, which describes the action, and data that is deserialized into an in-memory data structure defined by the protobuf schema.

The protocol uses the following message types (opcodes):

BLOCK_DATA: the streaming data fields, shard keys, and optional field aggregation information METADATA: For the Sender→Intermediary segment, it contains the ChunkStatus, as determined by the chunk tracking protocol. This indicates to the proxy if the transaction was successful or failed. A first-layer Intermediary must discard the data if the ChunkStatus has an error, when exactly-once processing is required.

For other segments (e.g., Intermediary→Intermediary, or →Receiver), it contains the StreamStatus describing the success or failure of the inbound stream. It also contains the chunk identifiers from which the data was derived. As described above, these are used to determine pipeline completeness in a tracking component.

COMMIT_OK is a message sent back when a node has received the acknowledgement (FWD_OK) from the other node.

The server (e.g., at the Intermediary node) receives input data from multiple upstream client sessions simultaneously. It identifies a bundle that represents the data emitted by confluence_p processing operations that combines all input data. To support at-most once processing, the bundle is considered successful if and only if all sessions that make up a bundle are successful.

When a client is done sending data messages, it sends the METADATA message to the downstream node. In the protocol shown in FIG. 4, a FWD_OK is sent when data from an incoming session is received and buffered at INT1. When all data has been received from the sessions (S1, S2, S3), INT1 can send the data downstream to R1. Similarly, an OK is sent from R1 when $C1_{INT1}$ has been received completely at R1.

Figure 6:
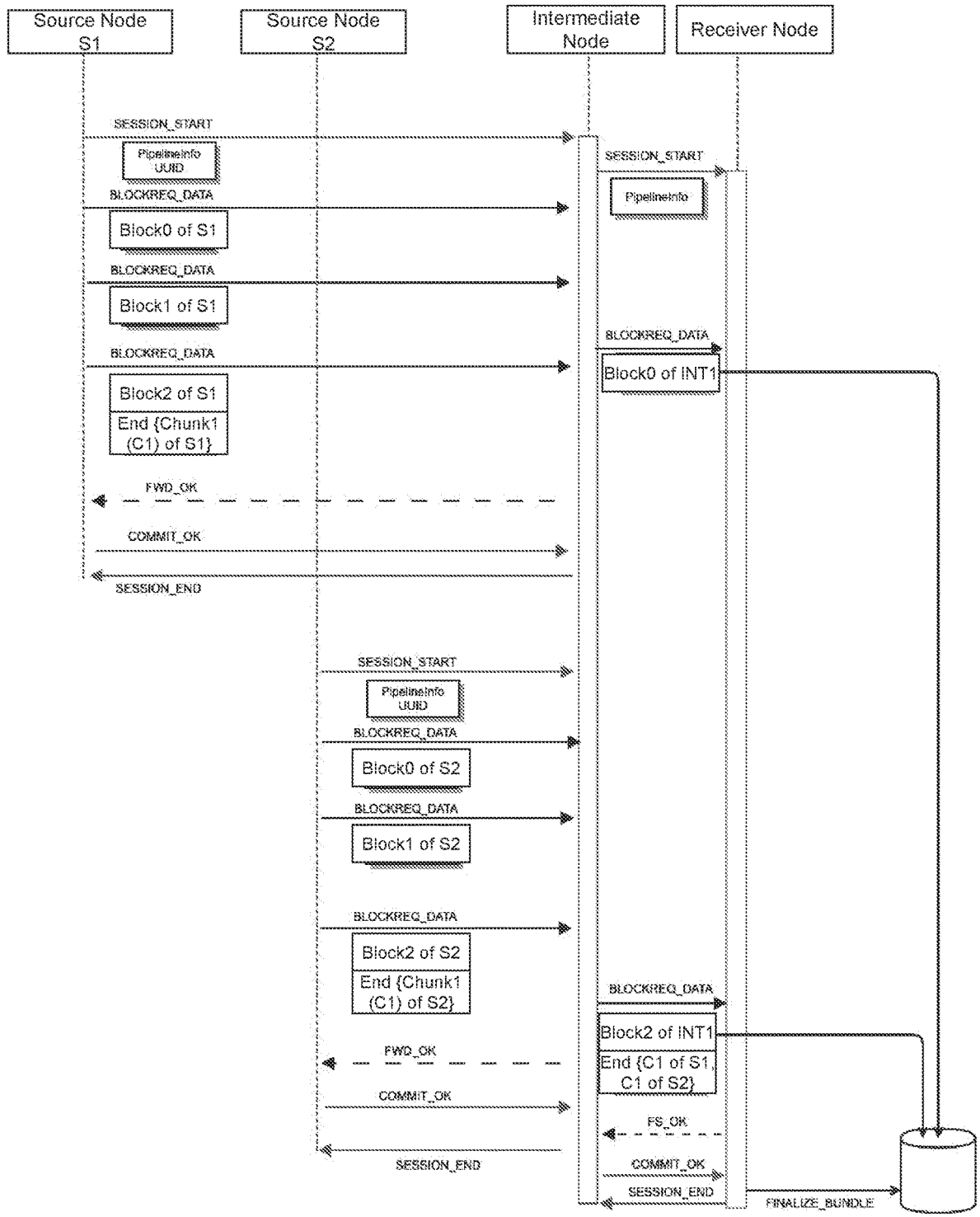
FIG. 6 is a sequence diagram illustrating communication amongst sources nodes, intermedia node, and receiver node, in accordance with one embodiment of the teachings hereof.

FIG. 6 is a sequence diagram illustrating in detail messages involved in the protocol. The illustration relates to an aggregation operation with two sources, one intermediary (proxy), and one receiver node. Time moves from top to bottom and the data flows from left to right in the figure.

Aggregation Tree

Figure 7:
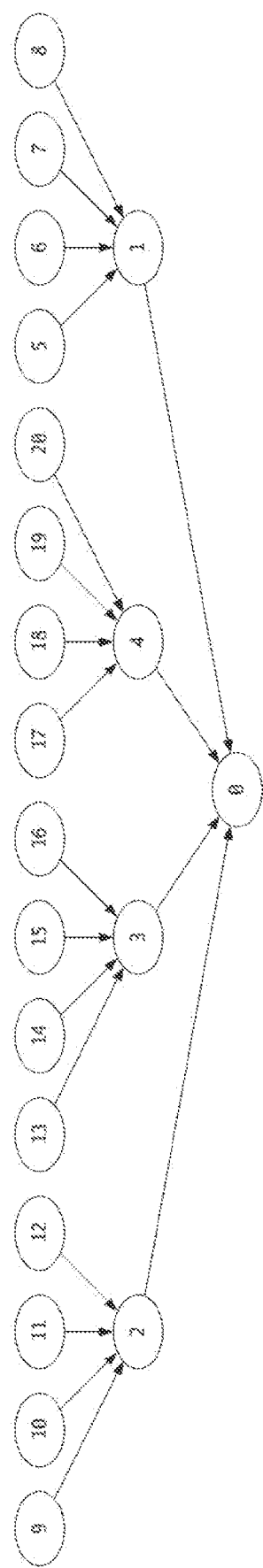
FIG. 7 is a diagram of a network topology related to the distribution computing systems discussed herein.

Connections established between nodes in the aggregation protocol (source, intermediate, and receiver) effectively create a path through which data travels across the system. An intermediary node receives data from multiple sources and constructs an outgoing bundle. This output may be sent to a receiver or to another proxy downstream. At the receiver, the outgoing bundle is the final aggregation output. Putting all the data paths together, we create an aggregation tree for every outgoing bundle. The receiver node is at the root of the tree, all intermediaries are internal nodes, and the source nodes are the leaves of the tree. An example is shown in FIG. 7. The tree is created dynamically by combining input from multiple sessions and sending it downstream. In FIG. 7, node (0) is the receiver, (1, . . . , 4) are the intermediaries/proxies, and {5, . . . , 20} are the source nodes.

Aggregation trees are created dynamically. When a node (e.g., the server in an intermediary or receiver node) receives a new session request, it adds that request to a bundle. A bundle is SEALED when a configurable number of sessions are added to the bundle or a timeout occurs. These two parameters represent the tradeoff between aggregation and latency. More simultaneous sessions have a greater chance of bundling related data together but the downstream nodes can consume the data only when all data from the incoming sessions has been processed.

A sealed bundle is flushed when all sessions finish and successfully close the session. The outgoing bundle closes the session gracefully by sending a flush request downstream, receiving a successful response from the proxy or the receiver, and deleting any locally stored data corresponding to this bundle. This protocol makes it so that the output bundle at the receiver is the last bundle to be flushed and all state related to the aggregation tree is cleaned up from the network.

Reprocessing and Recovery

As mentioned, the internode protocol can be used to ensure no duplicate processing of input data, i.e., it supports at-most-once processing. Failures along any edge in the aggregation tree results in the data being lost. And, as also mentioned, to support exactly-once processing, the system can identify the failed chunks and regenerate the data for these chunks.

Data regeneration can be classified as reprocessing or recovery. Reprocessing is when input data chunks are parsed to regenerate streaming data. Reprocessing is performed at the source nodes, and is an expensive operation. It involves reading archived log data, uncompressing it, and generating (key,value) pairs from it. Reprocessing supports the exactly-once service level.

Recovery supports the at-most-once service level. Recovery is when pipeline data from a failed aggregation tree is combined with other data at an intermediate or receiver node. This data is combined to generate the ongoing data flows. Recovery is the preferred mode of regeneration because the data does not require parsing, applying dynamic pipeline rules, and may be the result of multiple aggregation steps.

Regarding reprocessing: the system can provide two different reprocessing modes. When the intermediate node (confluence_p) that is processing streaming data can definitively identify a failed chunk, due to failure to establish session with the next layer, premature session disruption, etc., it can record these failures and later can schedule an asynchronous task for reprocessing at the nodes that archive raw log data. This localized reprocessing can be implemented without external coordination. However, there is additional book-keeping to remember chunks generated by successful reprocessing tasks as these tasks may be scheduled multiple times. A second reprocessing mode is a longer latency operation. The system records the chunk identifiers received by the system (e.g., the intermediate notes can send this information to a component configured for this purpose). The system then compares them against the identifiers generated at the root of all aggregation trees. Scheduling such reprocessing tasks frequently would likely result in wasted processing, as small delays due to transient network conditions, e.g., installs and key rotations, etc., would result in repeated scheduling of these tasks.

Independent of the scheduling granularity, the system implements book-keeping as follows: (1) reprocess output flows through the network without being aggregated with data from other chunks. This separates reprocessed data flows from others and allows the system to drop only the reprocessed data if the original processed data has already been received downstream, and (2) maintain a centralized repository of the output chunk identifiers. Before loading the data to an external sink system, a long-running service takes the metadata generated by the root of the aggregation tree and updates this centralized repository (e.g., thereby making it available as a data feed for the tracking component).

Regarding recovery: Regenerating data through recovery requires only local state at the intermediate and other non-leaf nodes of the aggregation tree in the system. Initiating recovery does not require any coordination and the local instance of the confluence_p service can use its local state to queue data buffered in memory or on disk, for recovery. The communication protocol ensures that data only from the failed sessions is logged and is a candidate for reprocessing. Therefore, the system does not require a centralized repository or any additional book-keeping.

Understanding Failure Propagation

This section describes how the failure of any node in a topology can propagate failure through an aggregation tree. It analyzes various strategies for mitigating failure while attempting to minimize the amount of overhead, which are leveraged in the systems and methods being described. In short, the systems and methods described in this patent document will be further understood in view of this section.

Each of the trees described in this section represent the data path flow for an aggregated bundle. The leaf nodes are the sources that produce data for a single chunk. The output of an intermediate node in the hierarchy is the aggregated data from all incoming sources. An oval with a heavy solid line (rather than a thinner solid line) represents a failed stage.

Figure 8A:
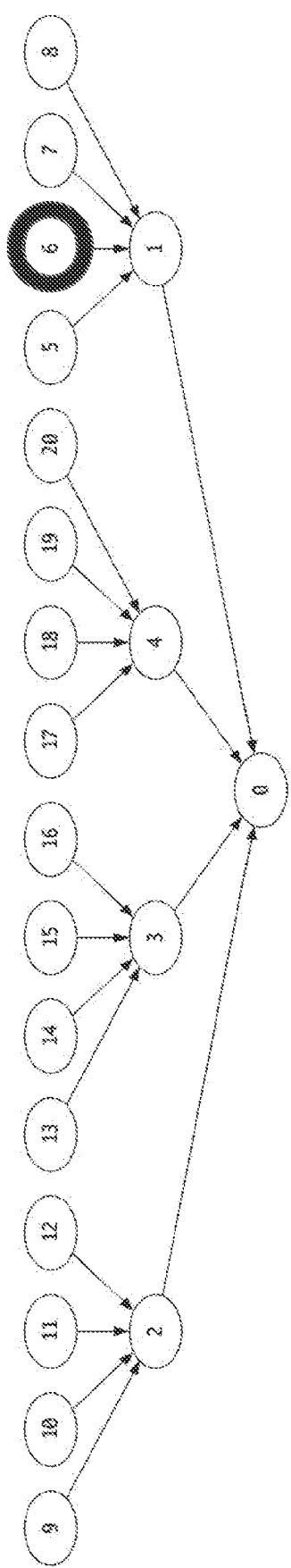
FIGS. 8A, 8B, 8C, 8D, 9 and 10 are each diagrams of a network topology related to the distribution computing systems discussed herein, showing how failures at nodes can propagate under different failure recovery models; and, FIG. 11 is a block diagram of hardware in a computer system that may be used to implement the teachings hereof.
Figure 8B:
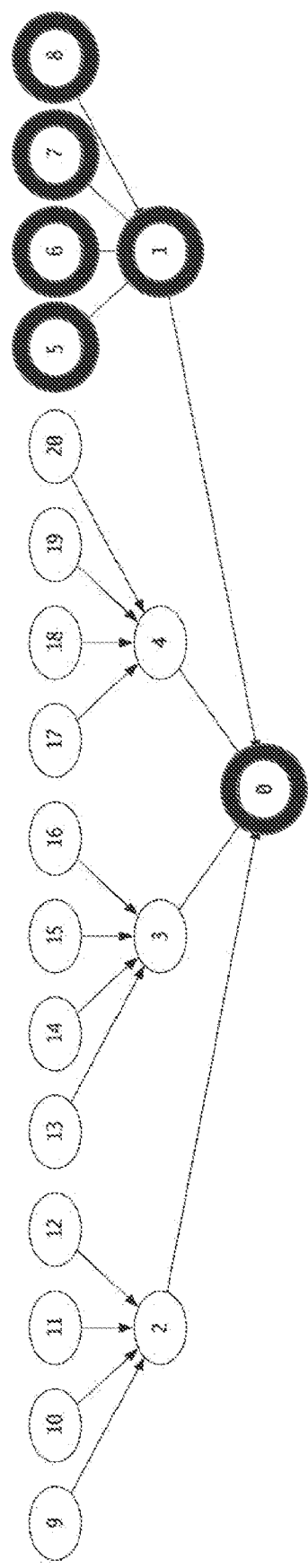
Figure 8C:
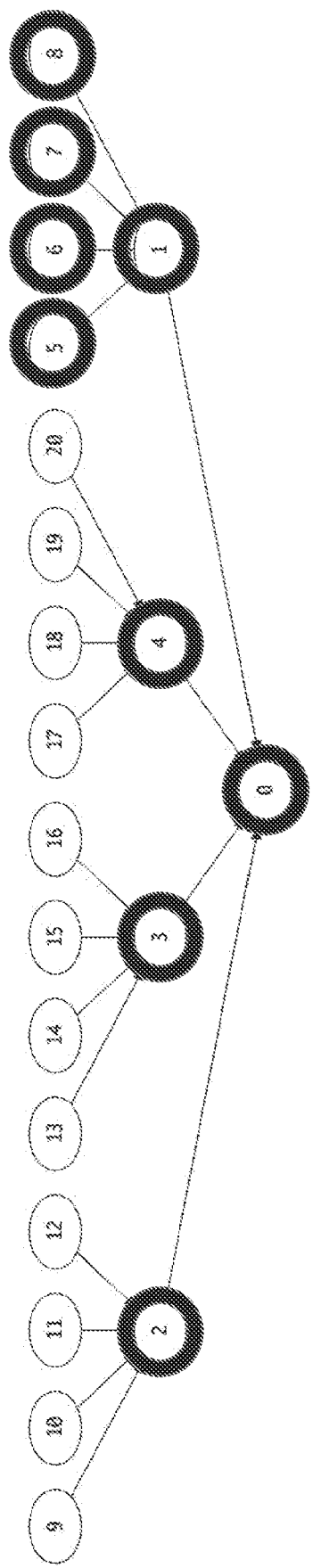
Figure 8D:
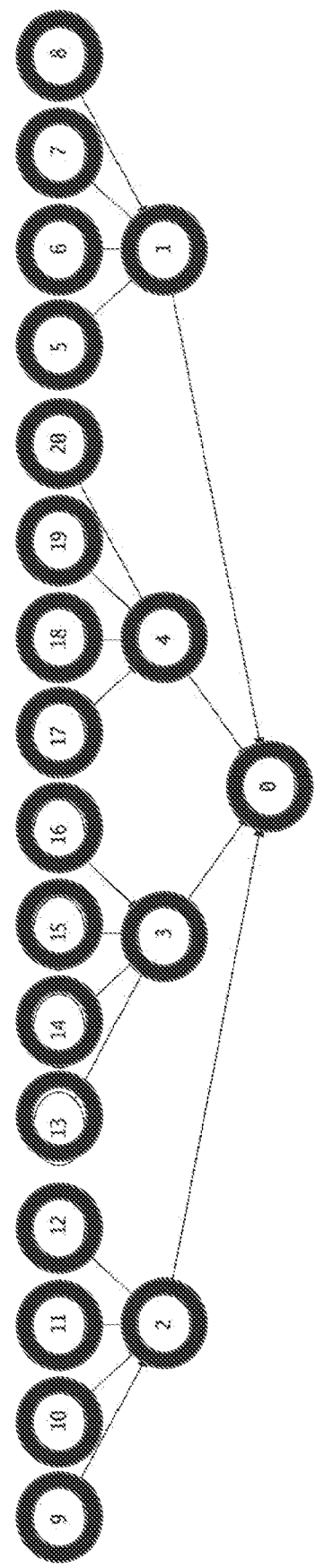

FIGS. 8A to 8D illustrate what occurs where there is no logging and no replay. FIG. 8A shows the failure beginning and its progress as shown in 8A to 8D. When we do not log any data, a single failure propagates to all nodes in the tree. This is because failure of any node taints its parent, thus transitively tainting the root. Additionally, the output failure makes receiving any data redundant and propagates failure to the children in the aggregation tree. While FIG. 8A to 8D show a leaf failure, node failure at any other level also results in discarding all data associated with this tree.

Figure 9:
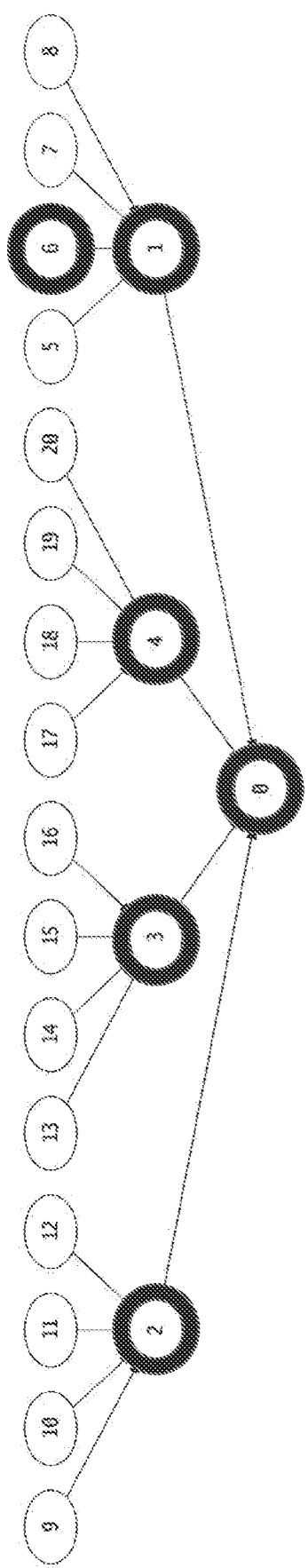

FIG. 9 shows failure propagation when only the outgoing data at the sources is logged. Any downstream failure now translates to regenerating data at the sender. While this approach may seem attractive, it requires all failures to reprocess data in the most unaggregated form and does not take advantage of the already completed network transfer. This causes higher latency because the replay starts at the leaf node in the tree above and must be replayed across the network. As shown in FIG. 9, the failure nodes must all discard data and reprocess. Data other than the failed leaf is available and can be reprocessed. Intermediaries connected to the leaf nodes must record in their local state the source nodes that they contact to start reprocessing. Additionally, the buffering at the leaf nodes requires resources at all source nodes.

To avoid wasting network transfers and aggregation performed downstream while limiting the failure impact, one might consider two approaches. The first approach is to buffer all incoming data to stable storage and recover from a failure by recomputing output from the buffered successful transfers. With this approach, when only a downstream node fails, we can recompute the output without any impact upstream. When an upstream node fails, we involve upstream to regenerate data only for the failed node. The second approach is to buffer outgoing data at the client (sender or proxy) and remember the data lineage (source and on-disk coordinates) at the server (proxy or receiver). On failure, request the data from the appropriate host and regenerate output.

The two techniques above are equivalent in the amount of replay required. However, the second approach requires pulling data from the nodes upstream because the outgoing data is buffered and we must gather the inputs to regenerate output. To reduce as much wasted work as possible without sacrificing correctness, the first approach is preferred. Buffering incoming data at the proxy and receiver yields the simplest design where we have minimal book-keeping and the work lost is limited to the failed path in the aggregation tree.

Figure 10:
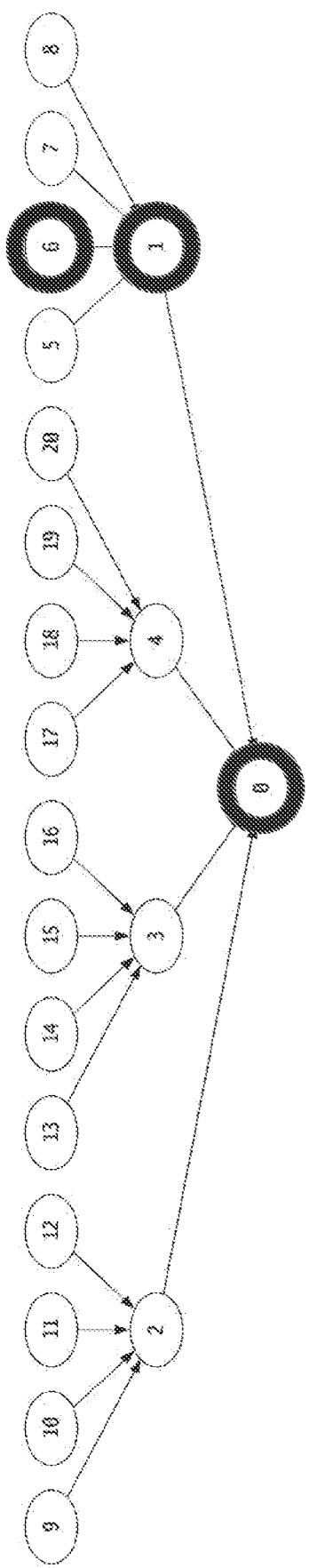

FIG. 10 shows failure propagation and localized repair when logging inputs. Nodes on the path starting at the failed node to the root of the tree discard data. However, data from all other incoming sessions at these nodes can be reaggregated and does not need to be regenerated.

Operation

The headwaters_p process runs on a machine (e.g. an edge server machine) that is receiving data blocks and identifying data chunks based on a configurable policy. The edge server adds a CHUNK_START and a CHUNK_END metadata block at the start and end of each chunk's data, and communicates with one or more headwaters_p, which are chunk parsers, over Shared Memory (SHM). Chunk data is divided into slot-sized segments and are serialized for headwaters_p to process.

The headwaters_p processes are the source nodes in the aggregation tree shown in the FIG. 6. A source node starts a new session with a unique stream id for each pipeline when it sees a CHUNK_START in the SHM. It then sends a BLOCKREQ_DATA block for every SHM slot it processes for the same chunk. When headwaters_p sees a CHUNK_END, it sends the metadata associated with this chunk (tracking status). The BLOCKREQ_DATA with piggybacked ChunkStatus metadata indicates a state transition. If there was no error in processing data and the tracking was successful, the receiving node now knows the chunk data is complete and can be regenerated by reprocessing the chunk identified in the metadata.

During chunk processing, the client (headwaters_p in source node) keeps the outgoing data and the server (confluence_p in intermediate node) keeps the incoming data in memory. Confluence_p sends the response (FWD_OK) in FIG. 6 when it receives the chunk status and the source node sends a COMMIT_OK in response. This message signals the intermediate node to take ownership of the stream blocks and is the last message sent by the client on this session. The intermediate node then ends the session. The source node can delete the range of all the blocks stored for the corresponding stream id.

A similar protocol is implemented between the intermediate node and the next stage (another intermediate node, or a receiver node). Instead of SHM, the client in this stage of the protocol combines data from multiple sessions and sends the aggregated or otherwise processed output downstream to the next node. As mentioned earlier, the aggregated output can be referred to as a bundle and it goes through three stages. A bundle is created when the first session is added to it, sealed when confluence_p determines it will not add incoming data from any new sessions to this bundle, and flushed when all incoming sessions are finished (SESSION_END).

Note that the system does not need to serialize the buffered data or store it on persistent storage until there is an error in the protocol or memory pressure. Error handling is different at the source nodes compared to other nodes in the aggregation tree. On the source nodes, since there is only the outgoing data, storing it with a unique identifier is sufficient. On other nodes, we have to handle multiple cases. When the outgoing session fails, a node must store data from all incoming sessions. When one or more of the incoming sessions have errors, we must close the outgoing session with an error and store data from all error-free incoming sessions to persistent storage. Finally, if a node reaches the memory limit, it must flush data from the largest buffered memory to stable storage.

The system maintains data in an embedded key-value store and keeps two tables. First, the data is stored with the session's unique identifier as the key. Second, the list of successfully received, but not successfully finished session identifiers is stored in a recovery table for quick access. Maintaining the two tables enables garbage collection for the data that has no reference from the recovery table.

Keeping Logging Costs Low

Buffering can be implemented using (1) an approach of maintaining the incoming serialized data until the bundle is flushed downstream and the acknowledgement is received. On failure, write the buffered data to disk; or (2) by maintaining the deserialized data until the bundle is flushed downstream and the acknowledgement is received. On failure, the data is serialized and written to disk.

During normal operation, incoming data is deserialized into an in-memory struct and the incoming bytes are not visible to the application-level service. The CPU cost of message serialization can be a significant contributor to the overall communication cost. Therefore, it is desirable to avoid this overhead when failures are uncommon.

The following components are part of the buffering overhead:

CPU for serialization
CPU and I/O when writing to stable storage
Memory for the buffered data As discussed in the previous section, the protocol requires a node to write data out to disk only when either its parent or one or more children in the aggregation tree has a failure. Memory needed for buffering incoming data is shared with the aggregation protocol and new memory does not become available over time unless currently allocated bytes are freed. To ensure sufficient memory is available for incoming data, we write some buffers to disk when under memory pressure even without failure.

Application to Aggregation and Other Data Processing Operations

Note that, throughout the above description, aggregation is used as an example use case. The teachings hereof are not limited to aggregating streaming data but instead may be applied to many other kinds of operations.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 11:
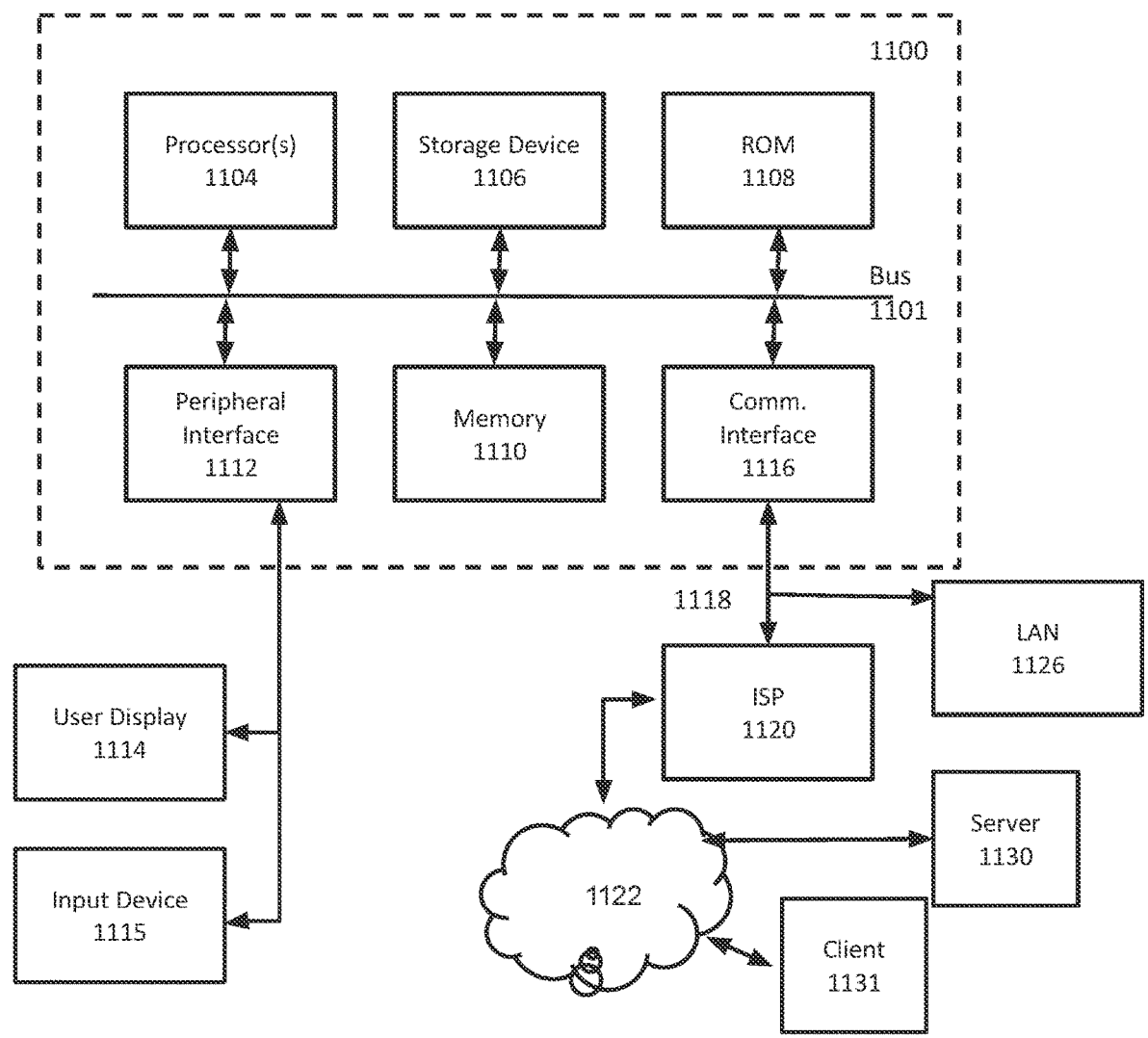

FIG. 11 is a block diagram that illustrates hardware in a computer system 1100 upon which such software may run in order to implement embodiments of the invention. The computer system 1100 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 1100 includes a microprocessor 1104 coupled to bus 1101. In some systems, multiple processor and/or processor cores may be employed. Computer system 1100 further includes a main memory 1110, such as a random access memory (RAM) or other storage device, coupled to the bus 1101 for storing information and instructions to be executed by processor 1104. A read only memory (ROM) 1108 is coupled to the bus 1101 for storing information and instructions for processor 1104. A non-volatile storage device 1106, such as a magnetic disk, solid state memory (e.g., flash memory), or optical disk, is provided and coupled to bus 1101 for storing information and instructions. Other application-specific integrated circuits (ASICs), field programmable gate arrays (FPGAs) or circuitry may be included in the computer system 1100 to perform functions described herein.

A peripheral interface 1112 may be provided to communicatively couple computer system 1100 to a user display 1114 that displays the output of software executing on the computer system, and an input device 1115 (e.g., a keyboard, mouse, trackpad, touchscreen) that communicates user input and instructions to the computer system 1100. However, in many embodiments, a computer system 1100 may not have a user interface beyond a network port, e.g., in the case of a server in a rack. The peripheral interface 1112 may include interface circuitry, control and/or level-shifting logic for local buses such as RS-485, Universal Serial Bus (USB), IEEE 1394, or other communication links.

Computer system 1100 is coupled to a communication interface 1116 that provides a link (e.g., at a physical layer, data link layer) between the system bus 1101 and an external communication link. The communication interface 1116 provides a network link 1118. The communication interface 1116 may represent an Ethernet or other network interface card (NIC), a wireless interface, modem, an optical interface, or other kind of input/output interface.

Network link 1118 provides data communication through one or more networks to other devices. Such devices include other computer systems that are part of a local area network (LAN) 1126. Furthermore, the network link 1118 provides a link, via an internet service provider (ISP) 1120, to the Internet 1122. In turn, the Internet 1122 may provide a link to other computing systems such as a remote server 1130 and/or a remote client 1131. Network link 1118 and such networks may transmit data using packet-switched, circuit-switched, or other data-transmission approaches.

In operation, the computer system 1100 may implement the functionality described herein as a result of the processor executing code. Such code may be read from or stored on a non-transitory computer-readable medium, such as memory 1110, ROM 1108, or storage device 1106. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 1118 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of failure recovery in streaming data processing that provides an at-most-once service level, the method comprising:

a plurality of sending nodes contemporaneously streaming input data chunks to a first node;

the first node generating one or more output data chunks from the input data chunks from the plurality of sending nodes, and the first node streaming the one or more output data chunks to a second node; and, the first node communicating with each of the plurality of sending nodes using a protocol in which transfer of each input data chunk from a respective sending node is concluded by a message exchange that commits the first node to perform failure recovery with respect to handling the just-transferred input data chunk, and releases the respective sending node therefrom;

wherein the first node begins sending the one or more output data chunks prior to receiving all of the input data chunks associated with the one or more output data chunks, and said failure recovery by the first node comprises:

upon a failure prior to a commitment for a given input data chunk from a given one of the plurality of sending nodes, the first node:

sending a failure message to the second node with respect to the one or more output data chunks, discarding a received portion of the given input data chunk that failed, re-generating the one or more output data chunks without the given input data chunk incorporated therein, based on a copy of the input data chunks other than the given input data chunk that failed, the copy being stored at the first node, and, sending the re-generated one or more output data chunks to the second node.

2. The method of claim 1, wherein the first node comprises an intermediary node, and the second node comprises another intermediary node.

3. The method of claim 1, wherein the first node comprises an intermediary node, and the second node comprises a receiver node.

4. The method of claim 1, wherein the first node generating one or more output data chunks from the input data chunks comprises merging the input data chunks such that the input data chunks are not individually recoverable from the one or more output data chunks.

5. The method of claim 1, wherein said generation of the one or more output data chunks comprises any of aggregating, combining, and summarizing the input data chunks.

6. The method of claim 1, wherein the message exchange comprises a mutual acknowledgement.

7. The method of claim 1, further comprising, as part of said failure recovery, the first node sending the given input data chunk to the second node in a later output data chunk.

8. A non-transitory computer readable medium holding program instructions for execution on one or more hardware processors of one or more computers, the program instructions, when executed on the one or more hardware processors:

providing a plurality of sending nodes, a first node, and, a second node, where the plurality of sending nodes contemporaneously stream input data chunks to the first node;

causing the first node to generate one or more output data chunks from the input data chunks from the plurality of sending nodes, and the first node streaming the one or more output data chunks to the second node;

causing the first node to communicate with each of the plurality of sending nodes using a protocol in which transfer of each input data chunk from a respective sending node is concluded by a message exchange that commits the first node to perform failure recovery with respect to handling the just-transferred input data chunk, and releases the respective sending node therefrom; and, causing the first node to begin sending the one or more output data chunks prior to receiving all of the input data chunks associated with the one or more output data chunks; and, wherein said failure recovery by the first node comprises:

upon a failure prior to a commitment for a given input data chunk from a given one of the plurality of sending nodes, the first node:

sending a failure message to the second node with respect to the one or more output data chunks, discarding a received portion of the given input data chunk that failed, re-generating the one or more output data chunks without the given input data chunk incorporated therein, based on a copy of the one or more input data chunks other than the given input data chunk that failed, the copy being stored at the first node, and, sending the re-generated one or more output data chunks to the second node.

9. The non-transitory computer readable medium of claim 8, wherein the first node comprises an intermediary node, and the second node comprises a receiver node.

10. The non-transitory computer readable medium of claim 8, wherein the first node comprises an intermediary node, and the second node comprises another intermediary node.

11. The non-transitory computer readable medium of claim 8, wherein, as part of said failure recovery, the first node sends the given input data chunk to the second node in a later output data chunk.

\* \* \* \* \*